US007555360B1

(12) United States Patent
Green et al.

(10) Patent No.: US 7,555,360 B1
(45) Date of Patent: Jun. 30, 2009

(54) APPARATUS AND METHOD FOR VENDING CANDY TABLETS FROM POWDER

(75) Inventors: Scott David Green, Birmingham, AL (US); Joseph Michael Wyatt, Pinson, AL (US)

(73) Assignee: Sandblast by Creative Concepts, Inc., Birmingham, AL (US)

( * ) Notice: Subject to any disclaimer, the term of this patent is extended or adjusted under 35 U.S.C. 154(b) by 431 days.

(21) Appl. No.: 11/273,218

(22) Filed: Nov. 14, 2005

(51) Int. Cl.
*G06F 17/00* (2006.01)

(52) U.S. Cl. ....................... 700/233; 700/231; 700/232; 700/239; 700/243; 700/206; 221/135; 221/1

(58) Field of Classification Search ......... 700/231–244; 221/1–312 C
See application file for complete search history.

(56) References Cited

U.S. PATENT DOCUMENTS

| | | | | | |
|---|---|---|---|---|---|
| 2,996,756 | A | * | 8/1961 | Korsch et al. | 425/145 |
| 3,910,739 | A | * | 10/1975 | Talis et al. | 425/209 |
| 3,997,063 | A | * | 12/1976 | Adams et al. | 414/675 |
| 5,238,144 | A | * | 8/1993 | Kornegay | 221/97 |
| 5,407,339 | A | * | 4/1995 | Fehlhafer | 425/106 |
| 5,947,330 | A | * | 9/1999 | Kim | 222/2 |
| 6,068,465 | A | * | 5/2000 | Wilson | 425/193 |
| D542,352 | S | * | 5/2007 | Green et al. | D20/1 |
| 7,231,279 | B2 | * | 6/2007 | Ghodotti | 700/239 |
| 2003/0010791 | A1 | * | 1/2003 | Gentiluomo et al. | 221/92 |
| 2003/0079612 | A1 | * | 5/2003 | Con | 99/275 |

* cited by examiner

*Primary Examiner*—Gene Crawford
*Assistant Examiner*—Michael K Collins
(74) *Attorney, Agent, or Firm*—Gerald M. Walsh; Kenneth M. Bush; Bush Intellectual Property Law

(57) ABSTRACT

A candy vending machine that manufactures candy tablets from candy powder by a process that is visible to a customer. A feed tube is filled with candy powders of different flavors and colors from candy powder containers by the action of motorized augers. A tableting machine receives candy powder from the feed tube to compress the candy powder into candy tablets. One or more flavor selection buttons signal a computer system to activate the candy powder containers to transfer the candy powder to the feed tube, to deliver the candy powder from the feed tube to the tableting machine, and to deliver the candy tablets to a tablet chute. The tablet chute delivers the candy tablets to a candy tablet container provided to a customer. Sensing mechanisms determine the presence of the candy powder in the candy powder containers and in the feed tube.

27 Claims, 7 Drawing Sheets

APPARATUS AND METHOD FOR VENDING CANDY TABLETS FROM POWDER

BACKGROUND OF THE INVENTION

1. Field of the Invention

The present invention relates to candy vending machines and, more particularly, to vending machines that make candy tablets from candy powder.

2. Technical Background

Vending machines for selling various kinds of candies are well known in the art. These machines accept money and provide a packaged candy. The attraction of the vending machine to the customer is usually created by the appearance of the vending machine and the trademark/trade dress of the products contained therein. Cotton candy machines make cotton candy from powdered or granulated sugar at the point of sale. These type of machines have a strong customer attraction feature because the customer can view the cotton candy being manufactured. The various colors of the cotton candy being manufactured also create a strong customer attraction. However, these cotton candy machines manufacture the candy only under the supervision of a vendor. The customer requests a purchase of the cotton candy product from the vendor, the vendor operates the machine to produce the product, and then provides the product to the customer after receiving payment from the customer. Although this process of manufacturing candy from powder or granules at the point of sale has a strong customer attraction, the profitability of the machine is compromised by the need to have a person on site to manufacture and sell the product. It would be significantly more profitable if a candy could be manufactured from powder at a customer's request in an automatic vending machine, with the machine delivering the candy product to the customer after the customer transacted payment directly with the machine.

SUMMARY OF THE INVENTION

The present invention is a vending machine that produces candy tablets from candy powder. Candy powders or granules in a variety of flavors and colors are stored in candy powder containers that have powered augers which deliver the powder to a feed tube. The feed tube collects the various selections of different flavored powders chosen by the customer. The feed tube transfers the powder to a tableting machine which compresses the powder into candy tablets. The candy tablets are then dispensed into a tablet chute which delivers the candy tablets into a candy tablet container which is provided to the customer by the vending machine. The front of the machine has a console with a display screen, flavor selection buttons, candy tablet container delivery mechanism, and a payment mechanism. The vending machine has a variety of sensors to monitor and activate the components of the machine by means of a computer and microprocessor system. A customer tenders payment to the payment mechanism and presses one or more flavor selection buttons until the feed tube is full. The process is visible to the customer who can watch the feed tube empty the candy powder into the tableting machine, watch the candy tablets formed, and see the candy tablets delivered into the candy tablet container.

An advantage of the present invention is a vending machine that automatically manufactures a candy product from candy powder.

Another advantage is a vending machine that produces candy tablets in a variety of flavors which can be selected by the customer.

Another advantage is a vending machine that has a high customer attraction by allowing the customer to observe the process of converting powder into candy tablets.

Another advantage is a vending machine that is relatively easy to construct, operate, and maintain.

DETAILED DESCRIPTION OF THE INVENTION

While the following description details the preferred embodiments of the present invention, it is to be understood that invention is not limited in its application to the details of construction and arrangement of the parts illustrated in the accompanying drawings, since the invention is capable of other embodiments and of being practiced in various ways.

Figure 1:
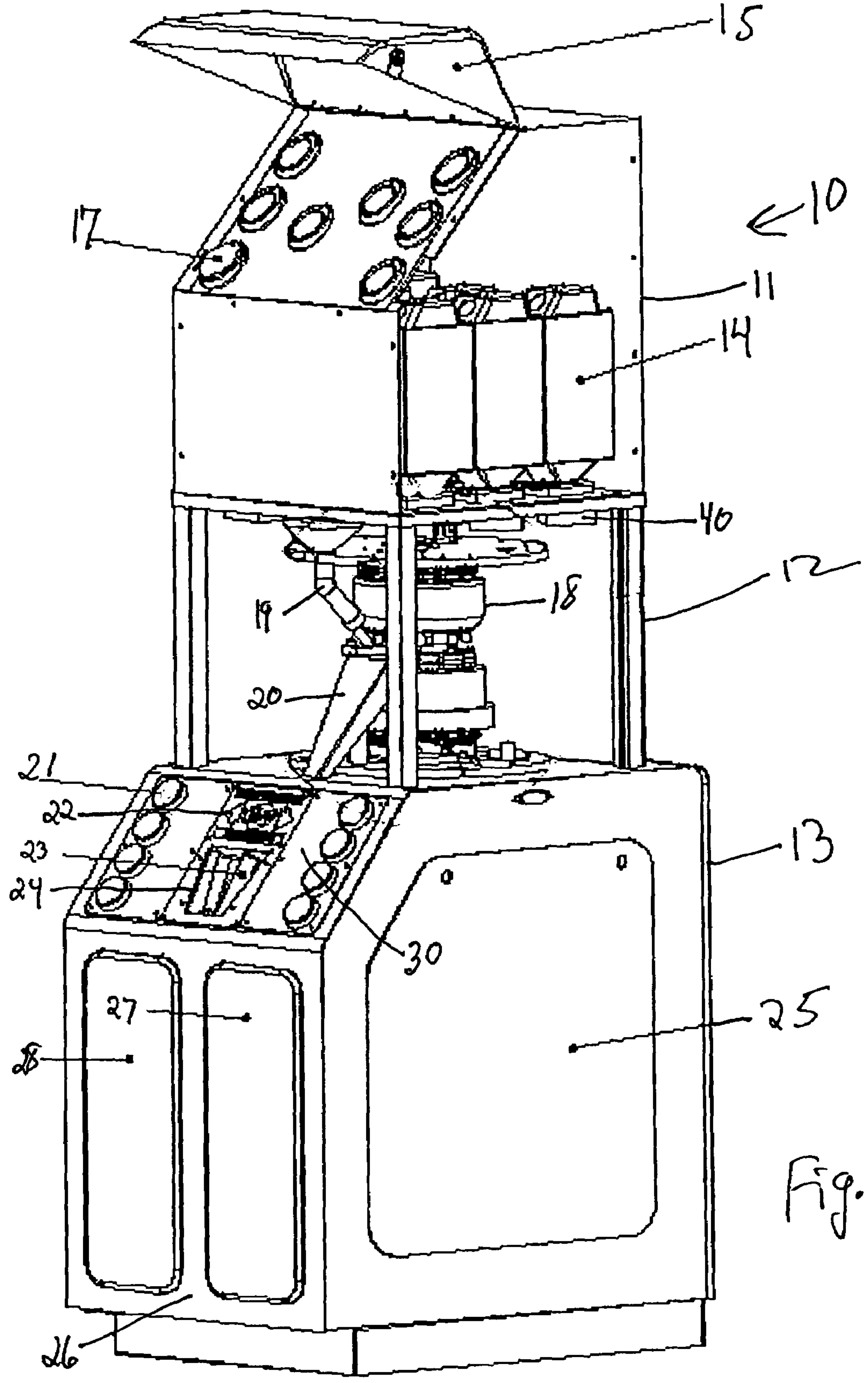
FIG. 1 shows a right front perspective view of the vending machine of the present invention.

FIG. 1 shows a right front perspective view of the vending machine 10 of the present invention. Vending machine 10 has an upper portion 11 which has one or more candy powder containers 14 and a lid 15 that covers one or more access fill ports 17 for filling the candy powder containers 14. Vending machine 10 has a middle portion 12 which has a tableting machine 18, a powder feed tube 19, and a tablet chute 20. Also shown are the auger motors 40 operatively connected to the candy powder containers 14. Vending machine 10 has a lower portion 13 having console 30 with one or more flavor selection buttons 21, an electronic visual display 22, a candy tablet container 23, and a candy tablet container holder 24. Lower portion 13 also has side panels 25 and a front panel 26. Front panel 26 has a right area 27 that can provide a payment receiving mechanism, and a left area 28 that can provide a candy tablet container delivery mechanism. Lower portion 13 can contain a computer system (not shown) and a turret motor (not shown) which rotates tableting machine 18.

Figure 2:
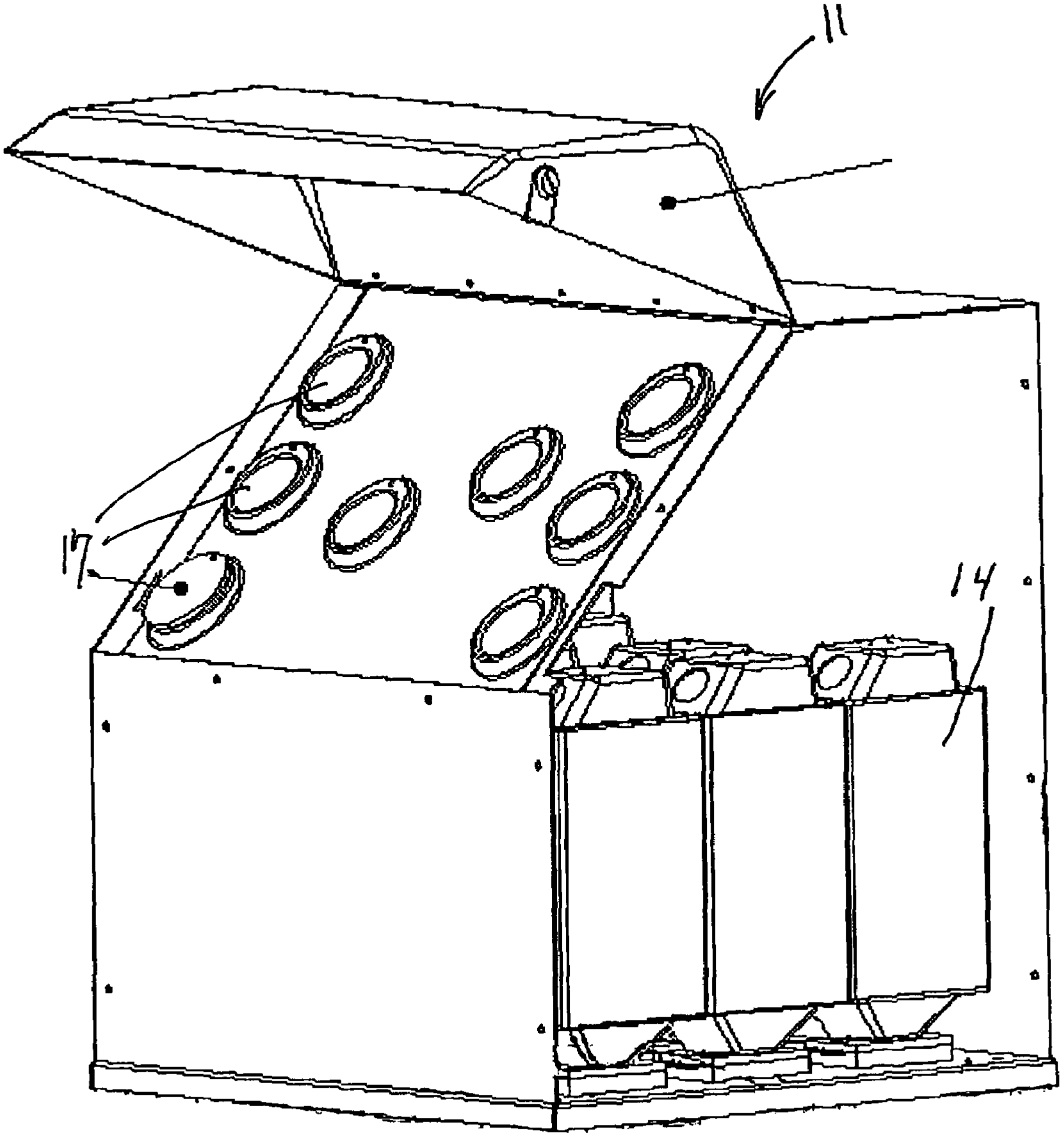
FIG. 2 shows a right front perspective view of the upper portion of the vending machine.
Figure 3:
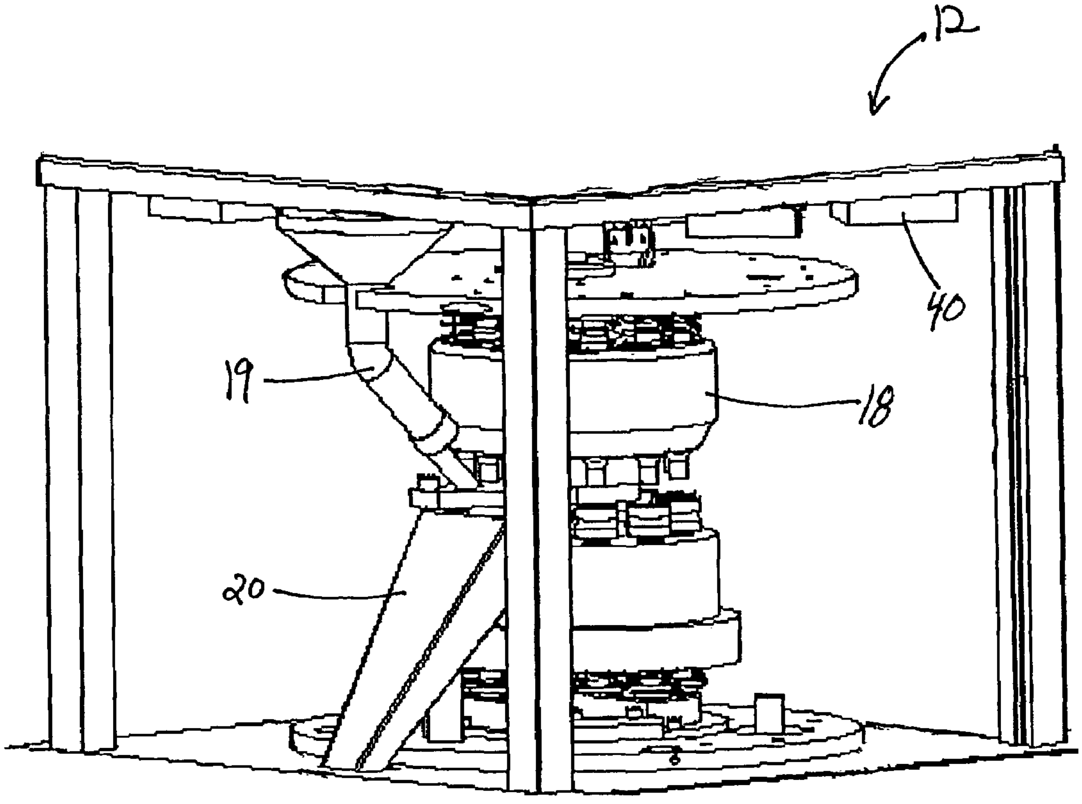
FIG. 3 shows a right front perspective view of the middle portion of the vending machine.
Figure 4:
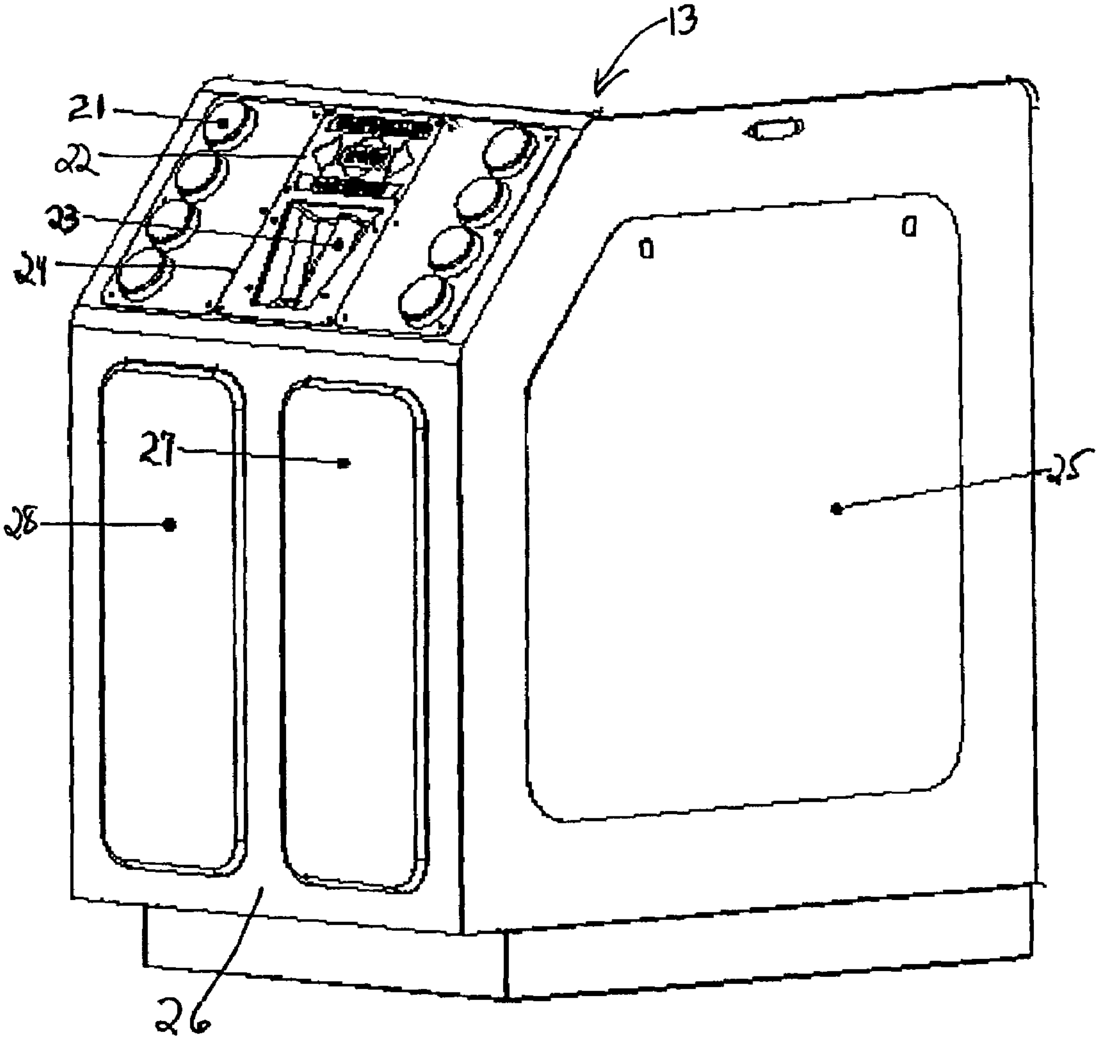
FIG. 4 shows a right front perspective view of the lower portion of the vending machine.
Figure 5:
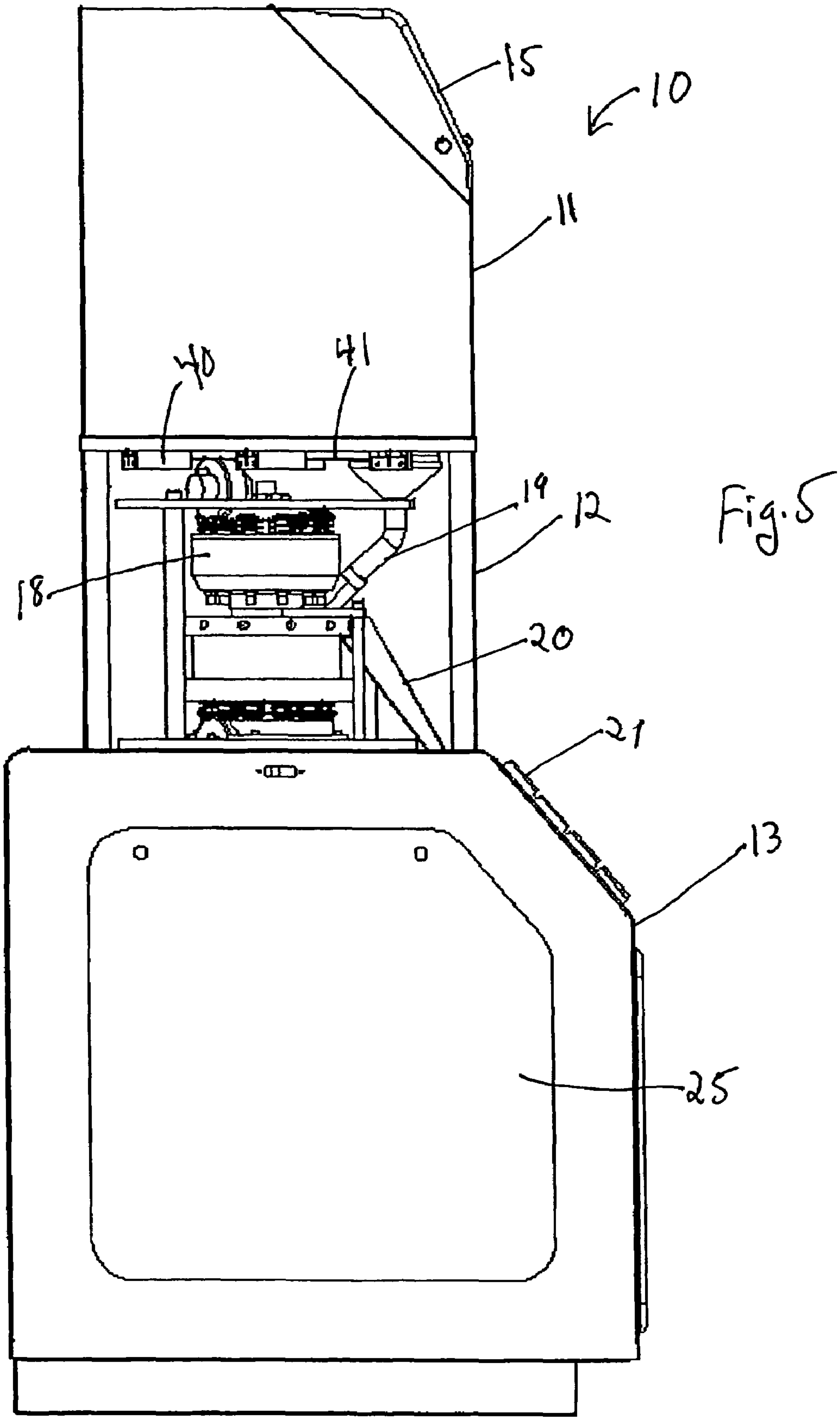
FIG. 5 shows a left side view of the vending machine.
Figure 6:
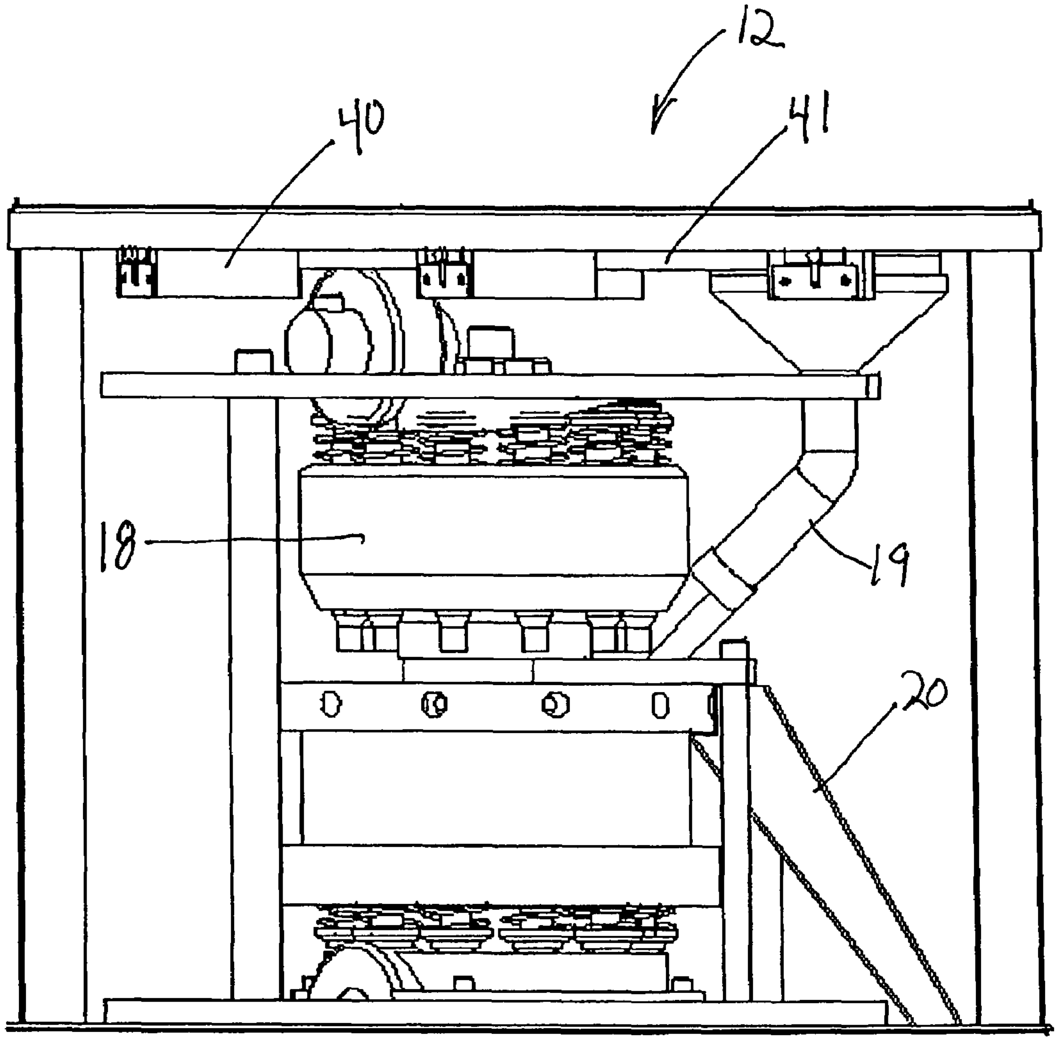
FIG. 6 shows a left side view of the middle portion of the vending machine.

FIGS. 2, 3, and 4 show expanded perspective views of upper portion 11, middle portion 12, and lower portion 13, respectively. FIG. 5 shows a side view of the vending machine 10, further illustrating augers 41 which deliver candy powder to feed tube 19 by the action of auger motors 40. FIG. 6 shows an expanded side view of middle portion 12.

The vending machine 10 changes several flavors, preferably up to eight, of candy from powder to tablets through customer interaction. After tendering payment into the payment mechanism provided by the vending machine 10, the customer is directed as to what to do by graphics and visual prompts shown on the visual display 22 which is, preferably, an interactive liquid crystal display (LCD). The customer receives a candy tablet container 23, preferably an empty candy tablet tube and cap, from the candy tablet container dispensing mechanism. The customer places the tube into the specified area 24 on the console 30 of the machine 10. The customer then selects his or her favorite flavors by pressing one or more flavor selection buttons 21. While each button is pressed, the candy flows into a transparent powder feed tube 19 where layers of colored candy powder are formed which can be viewed by the customer. After feed tube 19 has filled, the machine 10 automatically compresses the candy into tablets in the tableting machine 18, which can also be viewed by the customer. The tablets form in various colors coinciding with the selection of the flavors by the customer. The tablets are dispensed through the transparent tablet chute 20 into empty candy tablet tube 23 that was previously placed by the customer in the candy container area 24. The candy tablet tube 23 is removed and capped by the customer and the machine 10 is ready to begin the cycle again.

Vending machine 10 contains, preferably in lower portion 13, a computer system, including a microprocessor, which determines the timing of every aspect of the machine 10. The computer and microprocessor are typical of similar devices knows in the art, which are programmable, can store and retrieve data, process incoming signals, deliver outgoing signals and commands, and the like. Cycle counters are used to track maintenance schedules. Critical information can be accumulated for a "DEX Audit" output. Video and audio information is stored in memory banks and may be changed as necessary. The computer system can also manage what video is shown on the LCD 22 and when.

The LCD is a multi-function device that can be used in either a normal mode or a troubleshoot mode. The graphics that are displayed on LCD 22 can be unique to the mode. In the normal mode, the LCD 22 can provide instructions to the customer by prompting the customer graphically to retrieve the candy tablet tube 23 from the candy tablet container dispensing mechanism, to place the candy tablet tube 23 into the candy container holder 24, to select the candy by pressing the desired flavor selection buttons 21, and to select more candy if necessary. The normal mode also displays assorted images or short videos when the machine is inactive, and assorted images or short videos while candy powder is being tableted. In the troubleshoot mode, the LCD 22 can provide the functional status of the vending machine by displaying if the machine is out of candy tablet tubes 23, if a flavor of candy is not available, and the number of cycles until the next service of the machine is required.

The vending machine can enter into an attract mode during times of inactivity. In this mode the LCD can display various images or short videos. All flavor selection buttons can light sequentially, randomly, or blink or chase in random combinations. The machine can enter into credit up mode upon receipt of payment from a customer. In this mode the LCD can display various prompts at the appropriate times. All flavor selection buttons can light up that are determined by the computer system to be active by a candy powder availability check switch.

The candy tablet container dispensing mechanism can dispense candy tablet tubes 23 by utilizing two motors. A candy tablet tube-out sensor (limit switch) can be used to determine if the vending machine is out of tubes 23. An empty condition can be indicated on the LCD 22. An indicator light can be used to signal where the customer can receive the tube 23. After the candy tablet container dispensing mechanism has dispensed the candy tablet tube 23, the LCD 22 can prompt the customer to place the tube 23 into the candy container holder 24. The candy container holder 24 holds the tube 23 while the candy is being processed. The computer system can be configured such that the tube 23 must be positioned properly in the holder 24 in order for the tableting process to proceed. A candy container sensor switch can be used to detect the proper placement of the tube 23 in the holder 24. When the tube 23 is properly placed, the LCD 22 can prompt the customer to select the candy flavors as desired.

Each candy powder container 14 can use a sensor (candy powder check switch) to determine the availability of candy powder for processing. If a particular candy powder is available for processing, as determined by the candy powder check switch, the corresponding flavor selection button 21 can be lighted, and all functions pertaining to that flavor would operate. In this case the flavor selection button would be considered active. If a particular candy powder is unavailable for processing, as determined by the candy powder check switch, the corresponding flavor selection button would not light and all functions pertaining to that flavor would not work. In this case the flavor selection button would be considered inactive.

When a flavor selection button 21 is pressed, contacts are closed which supply power to a corresponding auger drive motor. The accumulated time that the flavor selection buttons 21 are pressed is tracked in the computer system. Each flavor selection button's 21 increment of time may be different than other flavor selection buttons 21 and can be adjustable in the computer system. When a predetermined time, as determined by the computer system, is reached all flavor selection buttons 21 become inactive. This predetermined time is referred to as the fill time. If the fill time is not achieved within a predetermined and adjustable amount of time, the computer system triggers the fill time as complete and the next process begins. When the computer system detects that a flavor selection button 21 has been pressed and released, an adjustable timer can be started. Until this timer expires, the given flavor selection button 21 will not be recognized for another press. When the computer system detects that a flavor selection button 21 has been pressed and released, another adjustable timer is started. When this timer expires the LCD 23 can prompt the customer to select more candy. This is an adjustable timer. Pressing a flavor selection button 21 that is inactive produces no response.

The candy powder feed tube 19 accumulates the various flavors of candy powder as selected by the flavor selection button 21. The candy powder is visible in the transparent feed tube 19 and the various flavors selected can be seen as different layers within feed tube 19. Feed tube 19 must be filled to a specific level for the proper number of tablets to be produced per cycle. The fill time determines this level. When the fill time is reached, the compression of the candy begins. This is accomplished by rotating a punch/die assembly or turret in the tableting machine 18 by means of a turret drive motor. As the turret rotates, candy powder from the powder feed tube 19 is compressed into tablets. Any suitable type of tableting machine can be used, preferably manufactured by Elizabeth-Scheu and Kniss, Louisville, Ky. (part number PC110). The powder feed tube 19 will completely empty of candy powder before the process ends and the correct amount of tablets will be produced. The amount of time involved to complete this process is referred to as cycle time. This time is set within the computer system and should be adjustable. As the candy tablets are produced, they are discharged from the tableting machine 18 via the tablet chute 20. The candy tablet travels down the tablet chute, which is visible to a customer, into the previously placed candy tablet tube 23. The customer removes the candy tablet tube 23 from the candy container holder 24 and the vending machine 10 is ready for the next vend. As the turret rotates, some excess candy powder may accumulate on the turret. A vacuum means may be used to keep excess candy powder from accumulating on the turret and can be automatically activated in conjunction with the turret drive motor.

Figure 7:
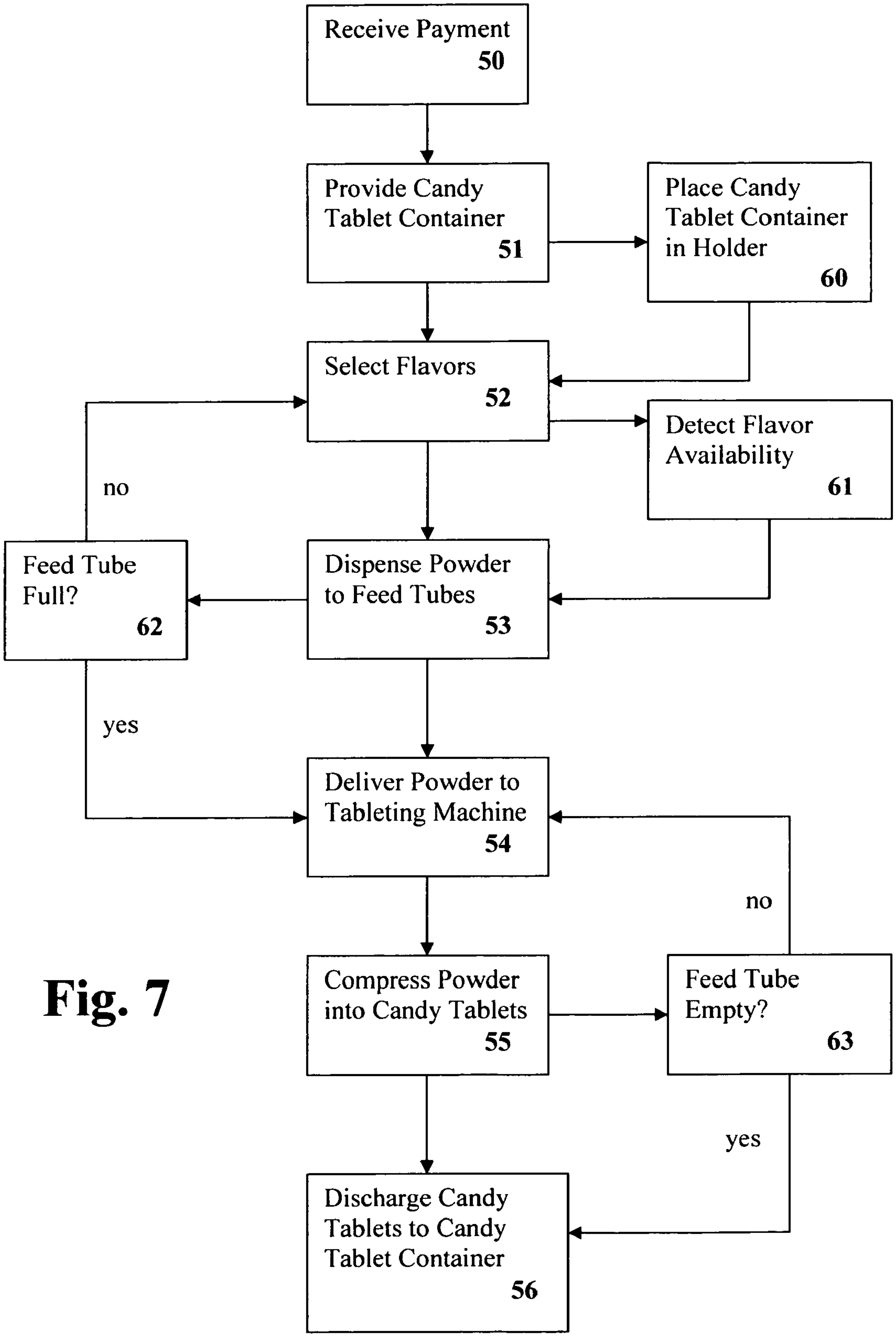
FIG. 7 shows the method of the present invention for vending candy tablets from candy powder.

The method of the present invention of vending candy tablets from candy powder is illustrated in FIG. 7. In step 50 payment is received from a customer by vending machine 10. In step 51 vending machine 10 provides the customer a candy tablet container or collection device 23. In step 52 the customer selects one or more flavors by pushing a flavor selection button 21. In step 53 candy powder is dispensed from the candy powder containers 14 to the feed tube 19. In step 54 the candy powder is delivered from the feed tube 19 to the tableting machine 18. In step 55 the tableting machine 18 compresses the candy powder into candy tablets. In step 56 the candy tablets are discharged through tablet chute 20 into candy container 23. In step 60, the method can require that the candy tablet container 23 be placed into a candy tablet container holder 24 before the process will proceed. In step 61, the presence of a selected flavor powder can be detected before the process proceeds. In step 62, the extent of filling of the feed tube 19 can be detected to determine whether more flavors should be selected. In step 63 the extent of filling of the feed tube 19 can be detected to determine whether candy tablets should be discharged through tablet chute 20 into candy container 23.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, a customer can pay at the vending machine using coins, bills, credit cards, debit cards, smart cards, tokens, and the like. Alternatively, the vending machine can be operated without any payment. Any type of suitable computer system and software known in the art can be used with the present invention, in addition to any type of suitable switches, sensors, sensing mechanisms, and audio/visual devices known in the art. Any type of display can be used, including a static display. Any suitable type of delivery mechanism can be used to transfer candy powder from the powder containers to the feed tube, besides motorized augers.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A vending machine, comprising:

a) one or more candy powder containers;

b) a feed tube which is filled with candy powder from said candy powder containers;

c) a tableting machine which receives candy powder from said feed tube to compress said candy powder into candy tablets; and d) a payment receiving mechanism.

2. The vending machine of claim 1, further comprising a tablet chute to receive said candy tablets from said tableting machine, said tablet chute delivering said candy tablets to a candy tablet container.

3. The vending machine of claim 1, further comprising a display device to provide instructions to a customer or to provide the functional status of the vending machine or a combination thereof.

4. The vending machine of claim 1, further comprising sensing mechanisms to determine the presence of said candy powder in said candy powder containers, and the presence of said candy powder in said feed tube.

5. The vending machine of claim 1 wherein said feed tube is transparent and said feed tube and said tableting machine are visible to a customer.

6. The vending machine of claim 1, further comprising motorized augers to fill said feed tube with candy powder from said candy powder containers.

7. The vending machine of claim 2, further comprising one or more flavor selection buttons and a computer system whereby activation of said flavor selection button signals said computer to activate said candy powder containers to transfer said candy powder to said feed tube, to deliver said candy powder from said feed tube to said tableting machine, and to deliver said candy tablets to said tablet chute.

8. The vending machine of claim 2, further comprising a sensor to determine the presence of said candy tablet container in a candy tablet container holder.

9. A vending machine, comprising:

a) one or more candy powder containers;

b) a feed tube which is filled with candy powder from said candy powder containers;

c) a tableting machine which receives candy powder from said feed tube to compress said candy powder into candy tablets;

d) said feed tube being transparent, and said feed tube and said tableting machine being visible to a customer; and e) one or more flavor selection buttons and a computer system whereby activation of said flavor selection button signals said computer to activate said candy powder containers to transfer said candy powder to said feed tube, to deliver said candy powder from said feed tube to said tableting machine, and to deliver said candy tablets to a tablet chute, said tablet chute delivering said candy tablets to a candy tablet container.

10. The vending machine of claim 9, further comprising a display device to provide instructions to a customer or to provide the functional status of the vending machine or a combination thereof.

11. The vending machine of claim 9, further comprising a payment receiving mechanism.

12. The vending machine of claim 9, further comprising sensing mechanisms to determine the presence of said candy powder in said candy powder containers, the presence of said candy powder in said feed tube, and the presence of said candy tablet container in a candy tablet container holder.

13. The vending machine of claim 9, further comprising motorized augers to fill said feed tube with candy powder from said candy powder containers.

14. A vending machine, comprising:

a) one or more candy powder containers having motorized augers;

b) a feed tube which is filled with candy powder from said candy powder containers by the action of said motorized augers;

c) a tableting machine which receives candy powder from said feed tube to compress said candy powder into candy tablets;

d) said feed tube being transparent, and said feed tube and said tableting machine being visible to a customer;

e) one or more flavor selection buttons and a computer system whereby activation of said flavor selection button signals said computer to activate said candy powder containers to transfer said candy powder to said feed tube, to deliver said candy powder from said feed tube to said tableting machine, and to deliver said candy tablets to a tablet chute, said tablet chute being transparent and visible to a customer, and delivering said candy tablets to a candy tablet container; and f) sensing mechanisms to determine the presence of said candy powder in said candy powder containers, the presence of said candy powder in said feed tube, and the presence of said candy tablet container in a candy tablet container holder.

15. The vending machine of claim 14, further comprising a display device to provide instructions to a customer or to provide the functional status of the vending machine or a combination thereof.

16. The vending machine of claim 15, further comprising a payment receiving mechanism.

17. A method of vending candy tablets from candy powder, comprising the steps of:

1) selecting flavors of candy powder;
2) dispensing said candy powder for each flavor selection from a candy powder container into a feed tube;
3) delivering said candy powder from said feed tube into a tableting machine;
4) compressing said candy powder into candy tablets; and
5) detecting the availability of flavors of candy powder.

18. The method of claim 17, further comprising the step of discharging said candy tablets into a tablet chute for collection by a customer.

19. The method of claim 17, further comprising the step of receiving payment from a customer for vending of said candy tablets.

20. The method of claim 17 wherein steps 2, 3, and 4 are visible to a customer.

21. The method of claim 17, further comprising the step of detecting whether said feed tube is empty or full.

22. A method of vending candy tablets from candy powder, comprising the steps of:

1) selecting flavors of candy powder;
2) dispensing said candy powder for each flavor selection from a candy powder container into a feed tube;
3) delivering said candy powder from said feed tube into a tableting machine;
4) compressing said candy powder into candy tablets; and
5) steps 2, 3, and 4 being visible to a customer.

23. The method of claim 22, further comprising the step of discharging said candy tablets into a tablet chute for collection by a candy tablet container.

24. The method of claim 22, further comprising the step of receiving payment from a customer for vending of said candy tablets.

25. The method of claim 22, further comprising the step of detecting the availability of flavors of candy powder and detecting whether said feed tube is empty or full.

26. A method of vending candy tablets from candy powder, comprising the steps of:

1) selecting flavors of candy powder;
2) dispensing said candy powder for each flavor selection from a candy powder container into a transparent feed tube;
3) delivering said candy powder from said feed tube into a tableting machine;
4) compressing said candy powder into candy tablets;
5) discharging said candy tablets into a transparent tablet chute for collection by a candy tablet container;
6) detecting the availability of flavors of candy powder and detecting whether said feed tube is empty or full; and
7) steps 2, 3, 4, and 5 being visible to a customer.

27. The method of claim 26, further comprising the step of receiving payment from a customer for vending of said candy tablets.

* * * * *